United States Patent [19]

Jackson

[11] Patent Number: 5,364,112
[45] Date of Patent: Nov. 15, 1994

[54] WHEEL ASSEMBLY FOR COMBINATION FOLDING LAWN CHAIR AND CART

[76] Inventor: William S. Jackson, 227 N. Grove St., Ypsilanti, Mich. 48198

[21] Appl. No.: 982,858

[22] Filed: Nov. 30, 1992

[51] Int. Cl.$^5$ .............................................. B62B 3/02
[52] U.S. Cl. .................... 280/30; 280/47.24; 280/47.18; 280/47.131; 280/652
[58] Field of Search ............... 280/30, 47.24, 47.18, 280/47.131, 652, 654, 646, 767, 47.25, 47.26, 47.19; 297/DIG. 4, ; 16/30

[56] References Cited

U.S. PATENT DOCUMENTS

| | | |
|---|---|---|
| 251,601 | 12/1881 | Keeler . |
| 2,840,142 | 6/1958 | Haug ........................ 280/30 |
| 3,073,614 | 1/1963 | Zinneman ................. 280/30 |
| 3,102,733 | 9/1963 | Burnett .................. 280/47.24 |
| 3,241,852 | 3/1966 | Muller et al. ........... 280/47.18 |
| 3,285,654 | 11/1966 | Cramer ..................... 297/35 |
| 3,758,128 | 9/1973 | Stenwall ............... 280/47.25 |
| 3,997,213 | 12/1976 | Smith et al. ............. 297/118 |
| 4,290,625 | 9/1981 | Barriere .................. 280/654 |
| 4,335,895 | 6/1982 | Walker ................ 280/47.131 |
| 4,376,547 | 3/1983 | Dominko .................. 280/30 |
| 4,448,434 | 5/1984 | Anderson ............. 280/654 X |
| 4,570,958 | 2/1986 | Walker ................ 280/652 X |
| 4,645,262 | 2/1987 | Furubotten ............ 297/129 |
| 4,659,142 | 4/1987 | Kuchinsky, Jr. ........ 297/118 |
| 4,703,944 | 11/1987 | Higson .................... 280/30 |
| 4,733,905 | 3/1988 | Buickerood et al. ... 297/129 |
| 4,749,209 | 6/1988 | Edmonds ................. 280/652 |
| 4,758,009 | 7/1988 | Abel ................ 280/47.18 X |
| 4,824,167 | 4/1989 | King ........................ 297/129 |
| 4,934,719 | 6/1990 | duPont ................ 280/30 X |
| 5,056,804 | 10/1991 | Wilson et al. ...... 280/652 X |
| 5,226,666 | 7/1993 | Dinkens, Jr. ............ 280/652 |

Primary Examiner—Margaret A. Focarino
Assistant Examiner—Florian Zeender
Attorney, Agent, or Firm—Krass & Young

[57] ABSTRACT

A pair of wheel assemblies adapted to attach to the rear legs of a folding lawn chair so that the chair can be used to transport heavy or bulky items from a car to a picnic site. The cargo is carried on the seat of the chair. The chair can be used for conventional seating purposes with the wheels in position ready for operation. The wheels are brought into contact with the ground by tipping the chair rearward. Each wheel assembly can be rotated about the axis of its associated leg and locked into a plurality of positions, including the position in which, for stacking and storage purposes, the wheel lays flat against the plane of the chairs rear leg assembly.

1 Claim, 3 Drawing Sheets

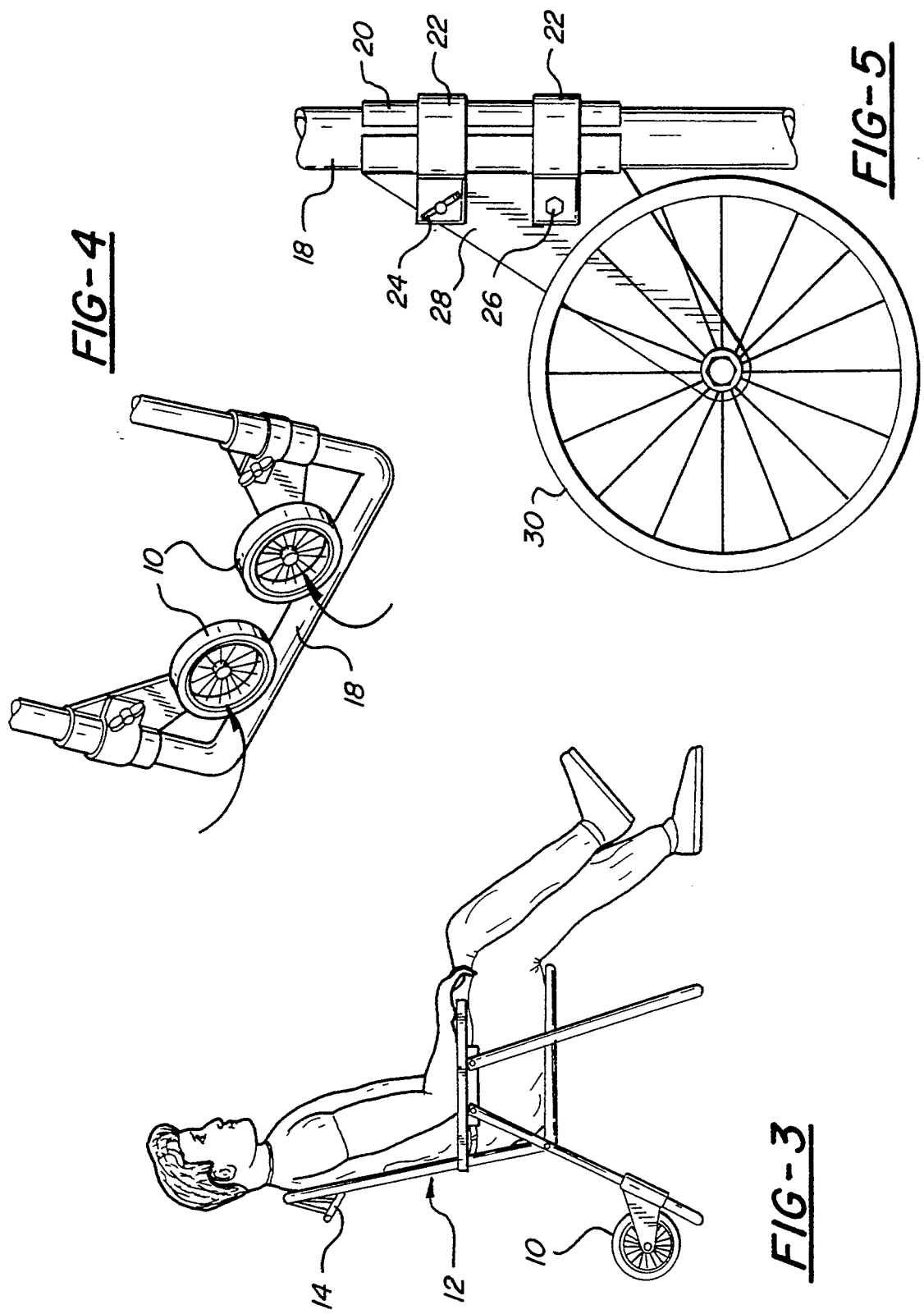

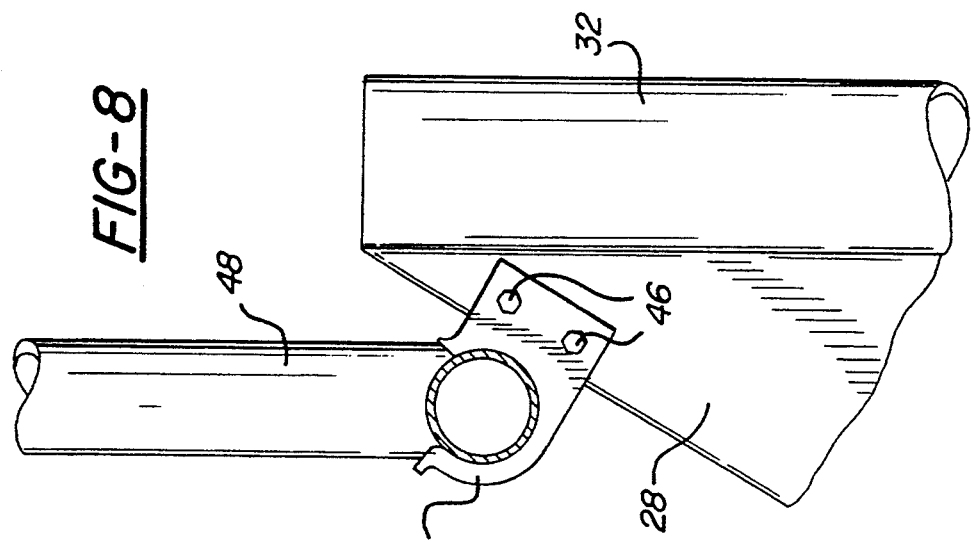
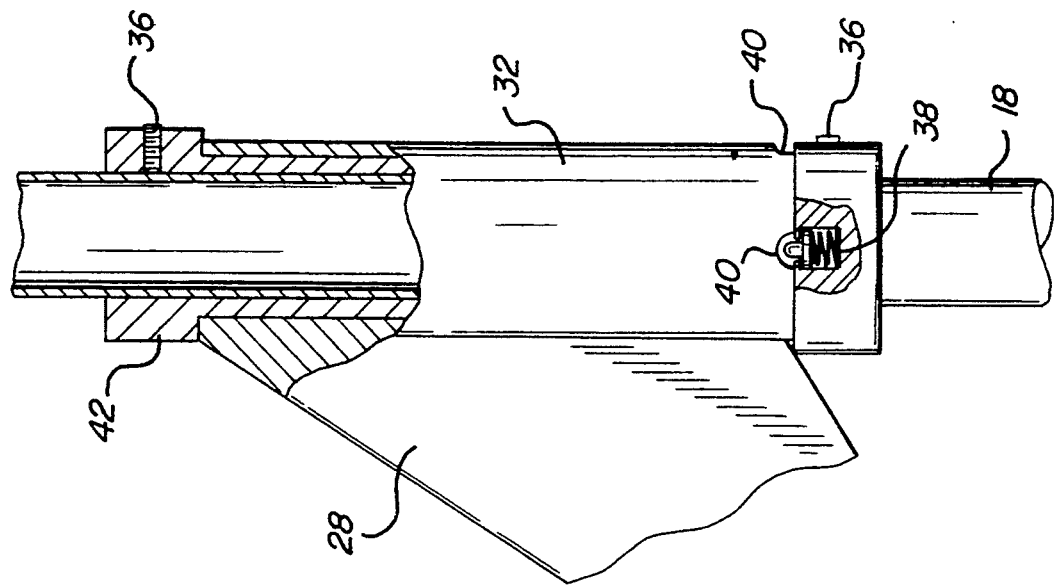
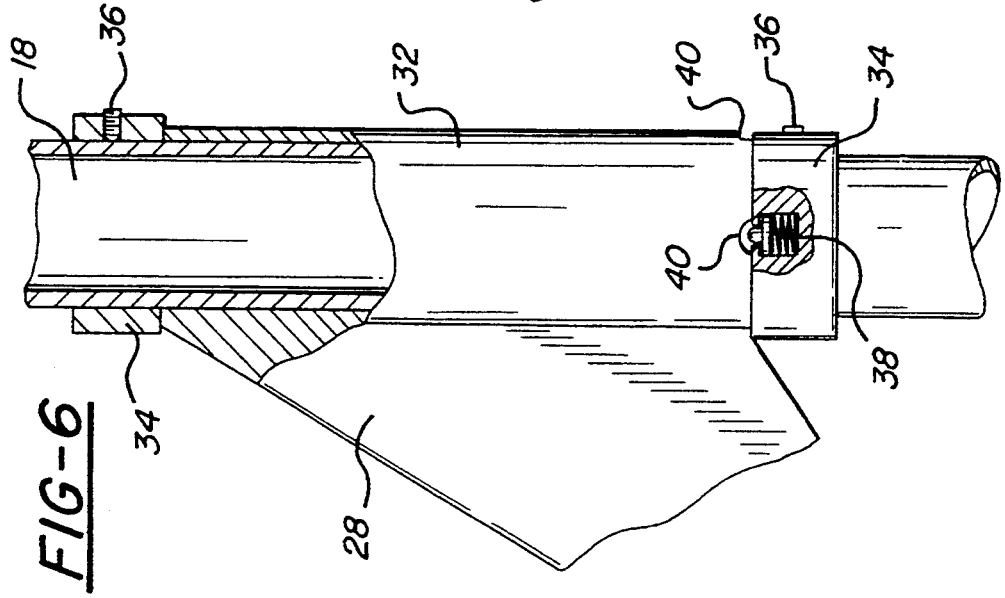

WHEEL ASSEMBLY FOR COMBINATION FOLDING LAWN CHAIR AND CART

FIELD OF THE INVENTION

This invention relates to portable chairs and more particularly to folding lawn chairs adapted with wheels so that, in addition to their use in a conventional manner, the chairs can be used to transport heavy or bulky items over distances.

BACKGROUND OF THE INVENTION

Transporting coolers, picnic baskets, blankets, recreational items, and lawn chairs from a parking lot to a recreation site can be an arduous task, sometimes requiring multiple trips to move all of the necessary supplies. To ease and expedite this process, chairs with wheels have been developed that can be alternately be used as carts to haul all of the gear to the recreation site in one trip.

U.S. Pat. 4,376,547 to Dominko teaches that a folding rachet-type lounge chair can be converted into a hand cart that can be used to transport articles. This type of chair has three seat sections, two end sections and a center section. Each section is joined to an adjacent section with a racheting hinge that allows the angle between two adjacent sections to be adjusted between zero and 180 degrees. A folding leg assembly is attached at each hinged joint.

In order to convert the lounge chair into a hand cart, one end section is folded flat against the center section while the other end section is fully extended for use as a handle. Near the hinge, a pair of wheel assemblies are each clamped onto the tubular frames of the two chair sections which have been folded flat against each other. To support the cargo, the leg assembly nearest the attached wheel assemblies is folded out to project in a direction opposite the direction that the wheel assemblies project. With the conversion complete, the chair is similar in resemblance and function to a hand dolly.

To revert the hand cart to a chair, the wheel assemblies' clamps must be loosened and then the assemblies moved from the tubular seat section frames to the tubular leg assembly which had served to support the cargo. There the wheel assemblies are positioned in the plane of the leg assembly, and the clamps retightened to secure the assemblies to the legs.

The design for a lounge chair convertible to a hand cart has some disadvantages. The processes to convert between a hand cart and a chair are time-consuming and complex. Additionally, the leg assembly which supports the cargo has a large void between the leg members through which smaller items could conceivably fall to the ground.

There have been several patents teaching the idea of a portable chair with wheels. Some of these patents disclose unusual chair designs that have rolling gear and cargo bearing structures integrated into the chairs themselves rather than attaching wheels to existing chairs. Other patents discuss ideas for permanently affixing wheels to existing chairs rather than removably attaching wheels to existing chairs.

SUMMARY OF THE INVENTION

This invention comprises a pair of wheel assemblies which attach to the tubular rear legs of a folding lawn chair and project rearwardly to enable the chair to sit on all four legs without the wheels touching the supporting surface when the chair is being used on a substantially flat surface for conventional seating purposes. Without any adjustment of the configuration of the wheel assemblies, the chair can be tipped rearwardly to bring the wheels into engagement with, the supporting surface to enable the chair to be used in an unfolded configuration as a hand cart for transporting cargo which is carried by the seat and seat back, or, in a folded configuration, the chair alone ban be rolled on the wheels. For compact storage of the chair, each wheel-,assembly can be rotated about its respective leg and positioned between the rear legs substantially flat against the plane of the rear legs.

The wheel assembly is affixed to a rear leg in a manner such that the chair does not require any permanent modifications. The assembly may be removed from the leg at any time and transferred to a different chair. The wheel assembly can be selectively locked into various positions. The configuration where the wheels point directly behind the chair, ready for use as a hand cart, and the configuration where the wheels are flat against the plane of the leg assembly are two such locking positions. The wheel assembly can be rotated about the axis of the leg between the various locking positions.

This invention constitutes an improvement over the prior art in several aspects. Firstly, the wheel assemblies can be installed onto existing lawn chairs, eliminating the need to purchase new chairs with the modifications integrated therein. Secondly, the chairs with wheel assemblies do not require adjustments to change over between use as a seat and use as a cart. Only minor adjustments are necessary to fold the wheel assemblies for storage purposes. Finally, the voids in the cargo carrying surfaces, namely the seat and seat back, are typically small enough so that the chairs can hold small items securely.

BRIEF DESCRIPTION OF THE DRAWINGS

FIG. 3 shows the position of the wheel assemblies attached to a chair of FIG. 1 being used for normal seating purposes according to the preferred embodiment;

FIG. 4 is a perspective view of the chair's rear leg assembly with the wheel assemblies positioned flat against the plane of the rear leg assembly according to the preferred embodiment;

FIG. 5 is a side view of the preferred embodiment of the invention with clamp type mounting hardware;

FIG. 6 is a side view of a first alternative embodiment of the invention with collar type mounting hardware and detentes;

FIG. 7 is a side view of a second alternative embodiment of the invention with collar and shim type mounting hardware and detentes; and FIG. 8 is a partial view of a holder mounted to the wheel assembly for carrying a folded chair on the back of the converted chair according to a third alternative embodiment.

DETAILED DESCRIPTION OF THE INVENTION

Figure 1:
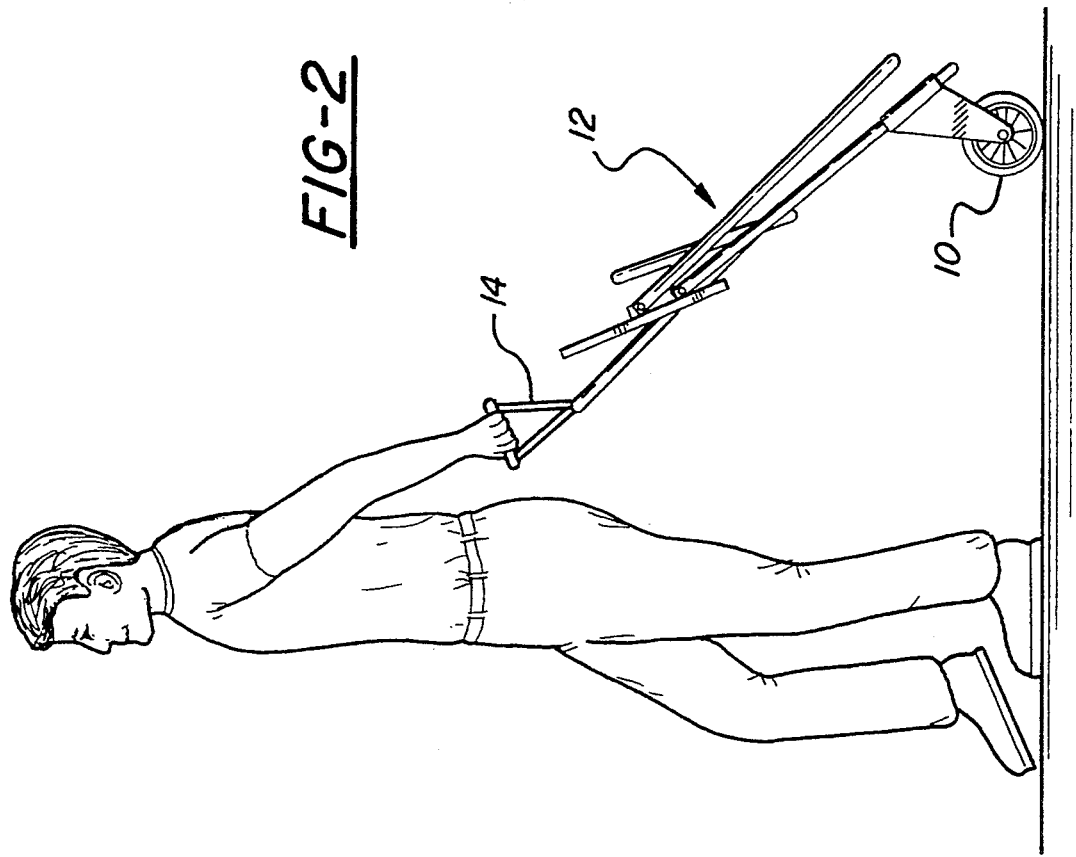
FIG. 1 illustrates a chair being used with the wheel assembly attachments as a hand cart for transporting cargo according to the preferred embodiment.

This invention proposes to modify a folding lawn chair with removably attached wheel assemblies. The chair 12, as portrayed in FIGS. 1 through 4, is a lawn chair constructed primarily of tubular material. This chair 12 has a seat 11 and a seat back 13 each constructed with a tubular frame 15 with pliable strips 17 stretched across the frame 15 to form a substantially uniform surface over which a load 16 may be distributed for support. The chair 12 additionally comprises "U" shaped leg assemblies 18, one in the front and one in the rear, each constructed of one piece of tubular material. Finally, a pair of arm rests 19 molded in plastic attach to the ends of the leg assemblies 18. These components are all hingeably interconnected that the chair 12 may be folded substantially flat for compact storage. The wheel assemblies 10 enable the chair 12 to be used as a hand cart for transporting cargo 16 without hindering the chair's 12 conventional seating utility. The wheel assemblies 10 can be installed on new or previously owned chairs, and can be removed from one chair and placed on another chair.

The preferred embodiment of the wheel assembly, as shown in FIG. 5, comprises a clamp type securing means. A tubular sheath 20, divided into two halves about a longitudinal axis, fits loosely over the tubular leg 18. An elongated bracket 28 affixed to the sheath 20 projects outwardly and downwardly from the sheath 20 at an acute angle to the axis of the sheath 20. Two flexible bands 22 wrap around the sheath 20, one near the top and one near the bottom of the sheath 20, and terminate on opposite faces of the bracket 28. A bolt 26, which projects through both ends of the lower band 22 and the bracket 28, is tightened to bring the two ends of the band closer together and thereby force the sheath 20 into contact with the leg 18. Similarly, a bolt with a finger nut 24 is used to tighten the upper band 22 around the sheath 20. To adjust the position of the wheel assembly 10 on the leg 18, the finger nut 24 must be loosened, then the wheel assembly 10 is rotated about the leg 18 to the desired position, and finally the finger nut 24 is retightened by hand. A wheel 30 is rotatably mounted to the end of the bracket 28 opposite the sheath 20. The wheel 30 may be offset some distance from the bracket 28 to provide clearance between the wheel 30 and the means for securing the wheel assembly to the leg. The wheel 30 and bracket. 28 virtually identical in the first and second alternative embodiments of the invention as illustrated in FIGS. 6 and 7 respectively.

Turning now to FIG. 1, the primary function of the preferred embodiment of the wheel assembly attachments, facilitating the transport cargo 16 which, is supported on the seat 11 and seat back 13, is illustrated. In this configuration, the wheel assemblies 10 point rearwardly so that when the chair 12 is tipped back, the wheel assemblies 10 support most of the weight of the chair 12 and the cargo 16 and the rest of the weight is transferred through the handle 14. By pulling on the handle 14 attached to the top of the seat back 13, a person is able to roll the chair 12 and cargo 16 over distances.

Figure 2:
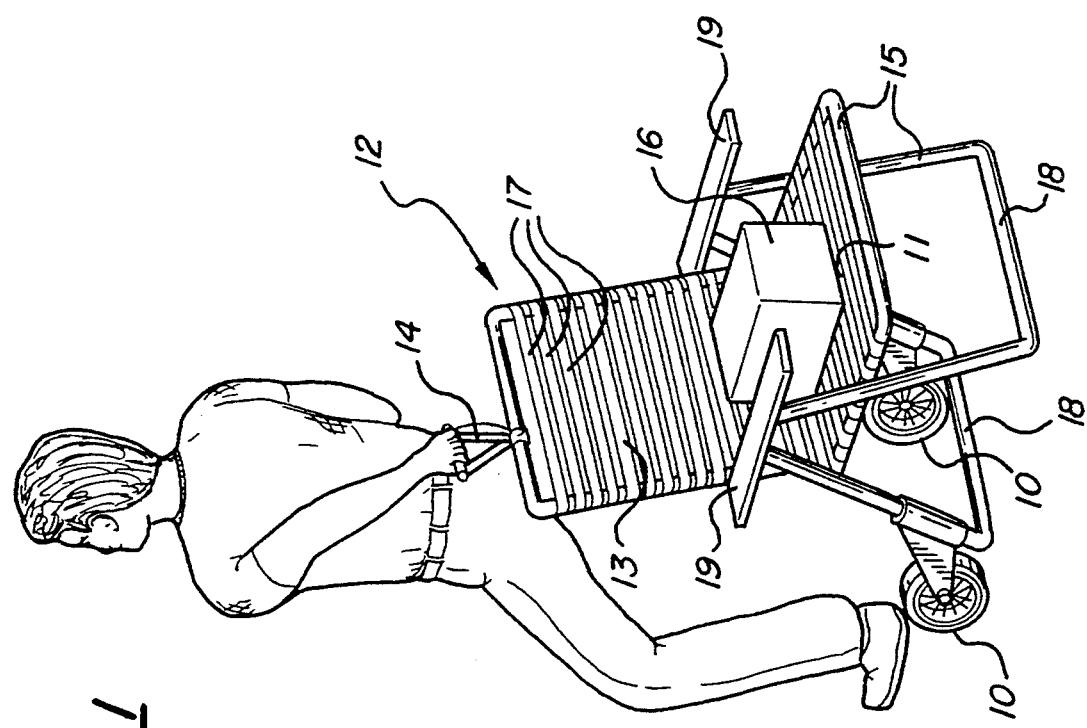
FIG. 2 depicts the chair of FIG. 1 in a folded configuration being rolled on the wheel assembly attachments according to the preferred embodiment.

The second mode of usage for the wheel assembly 10, as illustrated in FIG. 2, is in transporting a folded chair 12 without any cargo 16. What distinguishes this configuration from the previously described usage is that the chair 12 is folded and there is no cargo 16 supported on the seat 11 or seat back 13.

The chair may be used for conventional seating purposes, as illustrated in FIG. 3, without adjusting or removing the wheel assemblies 10 from the chair 12. The wheel assemblies 10 do not touch the surface supporting the chair when used in this manner. The chair must be tipped back some acute angle before the wheels will engage with the surface.

Turning to FIG. 4, the wheel assemblies 10 may be repositioned so that they sit flat against the plane of the leg assembly 18 when the chair is being stored or while the chair is being used for seating.

In carrying out the preferred embodiment of the invention as illustrated in FIGS. 1 through 3, a handle 14 is used. The role of the handle is two-fold. The first reason for having a handle 14 is to provide a convenient and comfortable means of grasping the chair 12 as the chair 12 is being pulled as a cart. The second reason for attaching a handle 14 to the chair 12 is to increase the angle at which the chair is tipped for carting purposes. If the angle is not great enough, the center of mass of the cargo 16 and chair 12 would be forward of the axle of the wheel assemblies 10 and the chair 12 would tend to tip back onto its legs. Therefore, the handle 14 eliminates the need, especially for tall people, to stoop when pulling the chair 12 on the wheel assemblies 10. The handle 14 comprises a rigid member which fits in a person's grasp and flexible straps which loop around the frame at the top of the chair back 13. It should be understood that many different handle designs are possible. The handle 14 should be sufficiently dimensioned such that the chair may be pulled by a person standing upright. If the handle 14 is too long, too much of the weight will be transferred through the handle 14, causing unnecessary exertion by the person pulling the cart.

A first alternative embodiment of the wheel assembly 10 is shown in FIG. 6. A sheath 32 completely encloses the tubular leg 18 loosely enough to allow the sheath 32 to be rotated about the leg 18. Two collars 34 abut the top and bottom of the sheath 32 to prevent the wheel assembly 10 from sliding up or down the leg 18. Set screws 36 secure the collars 34 to the leg 18. A detente feature consisting of a spring loaded pin 38 in the collar 34 and notches 40 in the sheath 32 adjacent to the collar 34 restrict the rotation of the sheath 32 at specific locations where the notches 40 and pin 38 mate. The sheath 32 can be rotated beyond these points by twisting the sheath 32 about the leg 18 with greater force. The notches 40 are positioned such that the sheath 32 resists rotation at the positions where the wheels 30 are ready for rolling the chair 12 or for storing the chair 12. There are many possible detente designs that would be equivalent to this design.

A second alternative embodiment of the wheel assembly 10 is shown in FIG. 7. The difference between this and the second embodiment is a shim connected between the two collars. This collar/shim assembly 42 still restricts the sheath 32 from sliding up and down the leg. By manufacturing collar/shim assemblies 42 with various inner diameters, the wheel assemblies 10 can be mated to chairs 12 of various leg diameters without correcting any other dimensions of the wheel assembly.

Further in accordance with the invention, a clip 44 is attached to the bracket 28 as shown FIG. 8. This clip 44 accommodates the transport of a folded chair on the back of the wheeled chair. In order for this particular embodiment to be effective, the rear leg assembly of the folded chair should be a "U" shaped one-piece assembly as depicted in FIG. 4. The leg assembly 48 of the folded chair snaps into the two clips on the two wheel assemblies 10. To hold the folded chair in place, the handle 14, secured to the frame at the top of the seat back of the first chair, is threaded through the top of the seat back of the folded chair.

It should be understood that this invention would work well on any upright (non-reclining) chair, folding or non-folding, tubular construction or non-tubular. The only restriction is on the diameter of leg that would mate properly with the wheel assembly 10. The folding lawn chair 12 is the most obvious candidate for application of this invention, but the scope of the invention should not be limited to the particular type of chair that has been previously described. It should also be understood that any design or construction of the rear leg assembly of the chair 12, whether it consists of two separate legs as stated in the claims, one leg assembly 18 as shown in FIG. 4, or any other equivalent design, is within the scope of the invention.

What is claimed is:

1. A pair of substantially identical wheel assemblies adapted to be removably attached to a pair of tubular rear legs, having central axes, of a non-reclining folding lawn chair, each assembly comprising:

means for securing said assembly to one leg of said rear legs to restrict motion of the assembly in the direction of said central axis of the leg, allow rotation of the assembly about the axis of such leg and selectively preclude rotation of the assembly about the axis of such leg at a plurality of positions so that said each assembly may be rotated about the axis of the leg between said positions, said means comprising a hollow shaft having opposite ends which surrounds the leg, two collars which abut each end of the hollow shaft and are secured to the leg, a sleeve which encloses the leg and joins said two collars, and a plurality of detentes supported at the point of abutment of each collar and said hollow shaft;

an elongated bracket having two ends connected by a central axis, one end connecting to said hollow shaft so that the central axis of said bracket projects downwardly and rearwardly at an acute angle to the leg when the assembly is secured to the leg;

a wheel rotatably mounted at the end of the bracket opposite the end of the bracket which is connected to said shaft, the wheel's axis of rotation lying parallel to a supporting surface for the chair at such time as the chair is unfolded, and parallel to a plane containing both rear legs whereby said wheel is aligned rearwardly from the chair with the point on the circumference of the wheel closest to said supporting surface being closely spaced above said supporting surface when the assembly is locked into a position which renders the assembly useable, whereby the chair may be used for normal seating purposes while unfolded, or may be tilted rearwardly to bring a point on the circumference of each said wheel in contact with said supporting surface so that the chair may be rolled on said wheel assemblies, and the assemblies may be rotated about the respective axe of said legs and locked in a position whereby the axis of each wheel lies in a plane perpendicular to the plane containing both rear legs so the chair may be folded and stowed.

* * * * *